(12) United States Patent
Darling (10) Patent No.: US 8,426,787 B2
(45) Date of Patent: Apr. 23, 2013

(54) HIGH SPEED, SPILL-PROOF COOKING CONTAINER

(76) Inventor: Dion Darling, Las Vegas, NV (US)

( * ) Notice: Subject to any disclaimer, the term of this patent is extended or adjusted under 35 U.S.C. 154(b) by 661 days.

(21) Appl. No.: 12/560,150

(22) Filed: Sep. 15, 2009

(65) Prior Publication Data

US 2010/0072208 A1 Mar. 25, 2010

Related U.S. Application Data

(63) Continuation-in-part of application No. 11/497,628, filed on Aug. 2, 2006, now abandoned.

(60) Provisional application No. 60/707,674, filed on Aug. 12, 2005.

(51) Int. Cl.
*H05B 6/80* (2006.01)

(52) U.S. Cl.
USPC .......................................... 219/735; 220/573.1

(58) Field of Classification Search .................. 219/735; 220/573.1
See application file for complete search history.

(56) References Cited

U.S. PATENT DOCUMENTS

| 111,067 | A | | 1/1871 | Lane |
| 310,468 | A | | 1/1885 | Schimper et al. |
| 1,371,718 | A | | 3/1921 | Zimmermann |
| 1,546,190 | A | | 9/1923 | Barish |
| 1,766,797 | A | | 11/1928 | Nakagawa |
| 2,079,281 | A | | 5/1937 | Duarte |
| 2,127,988 | A | | 8/1938 | Tarrant |
| 2,385,594 | A | | 9/1945 | Witte, Jr. |
| 2,845,059 | A | | 7/1958 | Kelleher |
| 3,465,745 | A | | 9/1969 | Butler |
| 4,298,131 | A | | 11/1981 | Saito et al. |
| 4,329,919 | A | * | 5/1982 | Andersen ........................ 99/359 |
| 4,574,776 | A | * | 3/1986 | Hidle ............................. 126/369 |
| 5,033,453 | A | | 7/1991 | Loyd et al. |
| 5,310,981 | A | * | 5/1994 | Sarnoff et al. ................ 219/731 |
| 5,311,981 | A | * | 5/1994 | Crandall et al. ........... 198/502.1 |
| 5,632,403 | A | * | 5/1997 | Deng ......................... 220/573.4 |
| 5,927,183 | A | * | 7/1999 | Lee ................................. 99/337 |

(Continued)

FOREIGN PATENT DOCUMENTS

| CN | 2165757 | 4/1994 |
| CN | 201019536 | 2/2008 |

(Continued)

OTHER PUBLICATIONS

Stainless Steel Blanch Pot with Overflow, Instawares, URL:http://www.instawares.com/stainless-steel-blanch-pot.tfs-229012b.0.7.htm.

*Primary Examiner* — A. Sefer (74) *Attorney, Agent, or Firm* — George R. McGuire; Rond Schoeneck & King (57) ABSTRACT

A high speed, spill-proof cooking container is provided with a novel design allowing for faster cooking speeds for multiple food varieties as well as spill-proof features. The cooking container comprises a container body having an opening defined by a rim and a lid. Inside the container body spaced from the rim is a first ledge which divides the container body into an upper segment, and a lower segment which holds the contents to be cooked. The upper segment further contains a second ledge disposed inside the container body between the first ledge and the rim. In the most preferred embodiment, the second ledge is parallel to the first ledge.

14 Claims, 6 Drawing Sheets

U.S. PATENT DOCUMENTS

| | | | |
|---|---|---|---|
| 6,125,842 A | 10/2000 | Loyd et al. | |
| 6,307,193 B1 * | 10/2001 | Toole | 219/735 |
| 6,536,603 B1 * | 3/2003 | Sollo | 210/469 |
| 2004/0045446 A1 * | 3/2004 | Park | 99/403 |
| 2004/0216620 A1 * | 11/2004 | Quiggins et al. | 99/413 |

FOREIGN PATENT DOCUMENTS

| | | | |
|---|---|---|---|
| GB | 23132 | | 0/1913 |
| GB | 367681 | | 6/1931 |
| JP | 2000-139698 | * | 5/2000 |

* cited by examiner

HIGH SPEED, SPILL-PROOF COOKING CONTAINER

RELATED APPLICATION DATA

This application is a continuation-in-part of U.S. patent application Ser. No. 11/497,628 filed Aug. 2, 2006, which claims priority to U.S. Provisional Application Ser. No. 60/707,674, entitled "Spill-Proof Cooking Container," filed Aug. 12, 2005.

FIELD OF THE INVENTION

The present invention generally relates to cookware and, more particularly, is concerned with a high speed, spill-proof cooking container designed to provide optimal cooking efficiencies including speed, flavor and food texture, the cooking container including a segmented container body and one or more vents to reduce the likelihood that the contents of the cooking container spill or boil over from the cooking container

BACKGROUND OF THE INVENTION

Cooking pots and pans can, under many circumstances, suffer from a phenomenon called "boil over." Boil over occurs when the contents of the cooking pot expand and force the contents over the rim of the cooking pot. This can be caused by many different mechanisms, including when the food being cooked gives off sugars, starches, or proteins, or otherwise becomes viscous, thereby increasing the surface tension of the contents of the cooking pot so that the steam bubbles formed during boiling do not burst. Instead, the steam bubbles build upon one another and cause rapid expansion of the contents of the cooking pot. The result is that the contents are forced from the cooking pot or pan and spill outward, often onto the cooking surface. The spillage can burn, thereby creating smoke and a burnt odor and, in more severe cases, a burn hazard to the cook and a risk of fire.

Boil over is usually controlled by cooking without a lid on the cooking pot or pan. This allows steam to escape from the cooking pot or pan and can, in certain circumstances, prevent boil over. However, in some circumstances, only constant stirring prevents or limits boil over. This is probably a familiar situation for many cooks who must constantly stir a pot of potatoes, pasta, gravy, sauce, or caramel to prevent boil over caused by the accumulation of starches or proteins, or other causes of increased viscosity, at the liquid surface. The drawbacks, aside from the inconvenience of constant stirring, are that constant stirring can extend cooking time by cooling the food and can break up certain foods, such as potatoes, thereby inadvertently altering the texture of the food.

Various pans with lids have been developed over the years toward resolving this boil over issue. Representative examples of prior art pans with lids are disclosed in U.S. Pat. No. 504,243 to Philippot, U.S. Pat. No. 1,461,366 to Mulford et al., U.S. Pat. No. 1,676,146 to Kraft, U.S. Pat. No. 1,810,860 to Tremblay, U.S. Pat. No 2,127,988 to Tarrant, U.S. Pat. No. 2,385,594 to Witte, Jr., U.S. Pat. No. 5,193,524 to Loyd et al., hereby incorporated by reference. However none of these prior at lids provide a comprehensive solution to preventing boiling over while maintaining cooking efficiencies including flavor and food texture. Namely, the lids allow for the escape of steam to reduce the boiling over effect, but at the same time results in a lengthening of the cooking time due to the escape of the steam. Also, during the cooking process flavor is lost and food texture compromised as a result of the loss of steam.

Turning to U.S. Pat. No. 5,033,453 which is hereby incorporated by reference shows an overflow cooking pot assembly. The assembly includes a main support pan member; an intermediate lid member; and a main outer lid member. The main support pan member is provided with a main support section integral with a fluid overflow section extending laterally and upwardly therefrom. The intermediate lid member is provided with vent slots to permit overheated fluid or food product to move into the fluid overflow section for cooling thereof One use of the basic cooking pot assembly is illustrated whereupon both the intermediate lid member and the main outer lid member can be mounted on the main support pan member for a steaming and cooking operation. This cooking pot assembly while addressing overflow is cumbersome requiring multiple lids and is not designed to provide maximum cooking efficiencies.

U.S. Pat. No. 6,125,842 discloses an overflow pan assembly with a splashguard cap and cap positioning means. The plate or lid has a series of holes or apertures on the top with a cover secured over the holes. The cover is freely moveable in an axial direction when pressure is exerted upwards upon it. Until the water or broth is heated up to a boil, the holes are closed capturing the steam within the pot. When the broth is boiled, the cover is shifted upward by the steam opening the holes for the boiled broth to discharge, pass along the plate or lid and back into the pot. Again, while this invention addresses the boil over spillage and maintains the steam in the pot, it only does so until the broth is boiled. The problem here is cooking of the food takes place for the most part after boiling and the steam is released already resulting in an inefficient cooking pot.

Thus, it can be seen that there is a need in the art for a faster cooking container that cooks combining the efficiencies of steam and boiling in a controlled manner such that food taste and texture is preserved. The container of the invention also reduces the likelihood that boil over will occur and, if the phenomenon does occur, ensures that the contents are contained, rather than spilling from the cooking container.

SUMMARY OF THE INVENTION

The present invention provides a cooking container including a container body with an opening. The opening is defined by a rim. Spaced from the rim into the container body is a ledge to divide the container body into an upper segment and a lower segment. In an optional embodiment, the ledge projects from the container body to define a second opening smaller than the opening at the rim. The cooking container further includes a lid that is shaped and sized to fit into the opening and rest upon the ledge such that the lid is spaced from the opening defined by the rim. In this manner, the lid separates the lower segment of the container body from the upper segment of the container body.

More particularly, the cooking container includes at least one to four vents or aperture located in the lid or the container body for the boiling broth or water to pass through. In a more preferred embodiment the cooking container of the invention contains at least two vents or apertures located in the lid. In another embodiment, the vent or aperture is formed by notches in the ledge in the container body. The notches extend through the ledge to create a passage between the lower segment of the container body and the upper segment of the container body for passage of steam and boiling broth or water from the lower segment of the container body to the upper segment of the container body.

The vent or aperture ranges in size preferably between about 2 centimeters to about ¾ inch depending on the lid size and weight and, more preferably are about ¼ inch in diameter for each vent. The lid size is dependent on the diameter of the cooking container. The lid weight must be sufficient enough to keep the lid properly nestled onto the pot when the steam is pushing upward from the boiling broth or water; yet not too heavy such that the lid cannot be displaced slightly upward by the steam build-up in the container thereby allowing the steam and contents in the container to escape upward as is readily apparent in the invention. Preferably, the lid is comprised of commercially available grade steel gage from 0.5 millimeters to about 2.5 millimeters in thickness, and most preferably about 1.2 millimeters in thickness for a pot having a diameter of 11 inches.

The High Speed, Spill-Proof Cooking Container of the invention exhibits new and novel cooking features over the prior art pots. The novel design of the present container allows for multiple food varieties to be cooked faster than readily know, commercially available pots. Moreover, the food cooked in the container of the invention retains its flavor and does not saturate or break down during the cooking process while keeping its original composition/consistency. Additionally, one can cook multiple food types (e.g., chicken and fish) at the same time in the pot of the present invention without the food co-mingling flavors.

The most preferred embodiment of the cooking container of the invention comprises a container body having an opening defined by a rim and a lid. Inside the container body spaced from the rim is a first ledge which divides the container body into an upper segment, and a lower segment which holds the contents to be cooked. The upper segment further contains a second ledge disposed inside the container body between the first ledge and the rim. In the most preferred embodiment, the second ledge is parallel to the first ledge. The lid is sized to pass through the opening and rest on the first ledge such that when the lid rests on the first ledge. The lid is spaced from the opening defined by the rim to separate the lower segment of the container body from the upper segment of the container body. The lid contains at least one vent and, preferably two vents on the parameter thereof forming a passage in the cooking container between the lower segment of the container body and the upper segment of the container body for steam and cooking contents to pass through. A steam trap is defined by the space between the first ledge and the second ledge for trapping the steam escaping from the lower segment or through the vents. By trapping steam vapor steam returns to liquid form and then there is a flow back into the lower segment of the container. A pot reservoir is defined by the space between the second ledge and the rim for trapping the steam and contents after it escapes from the lower segment thereby preventing spillage or boiling over.

During cooking, it is understood that the pot reservoir space is maximized to contain the steam and contents from the container during boiling thereby preventing spillage or boiling over. The contents drip back into the container over the steam trap into the lower segment.

With specific reference to the Figures, there are shown dimensions of the lid, container, ledges, steam trap and pot reservoir. It is understood and within the scope of the present invention to change these dimension depending on the size and shape of the pot provided the ratios between the various dimensions remain the same in order to maximize cooking efficiency.

These and other features and advantages of the present invention will become apparent to those skilled in the art upon a reading of the following detailed description when taken in conjunction with the drawings wherein there is shown and described an illustrative embodiment of the invention.

FIGURES OF THE INVENTION

The following is a discussion and description of preferred embodiments of the cooking container of this invention. It is understood that such discussion and description is not intended to unduly limit the scope of the invention.

DETAILED DESCRIPTION OF THE INVENTION

Reference is now made to the figures wherein like parts are referred to by like numerals throughout.

The present invention addresses the need in the marketplace for a high speed, spill-proof cooking container (pot). The advantages of the designs of the present invention will be readily apparent to one skilled in the art when taking into account the Examples listed hereinafter. More specifically, the high speed, spill-proof cooking container of the invention maximizes the steam build-up within the pot to optimize the cooking process, while at the same time the design of the pot automatically regulates the pressure caused by the steam build-up such that it is released from the vent or apertures in the lid thereby preventing an unsafe cooking environment. The pot of the present invention provides all the benefits of a pressure cooker in an easy to use, commercially safe cooking container. The pot of the present invention, unlike a pressure cooker, does not require constant monitoring for dangerous level of pressure build-up therefore safer to use in home cooking. The steam vapor generated during cooking creates a seal between the pot and lid which in effect based on the design of the container builds up additional pressure maximizing cooking time and cooking efficiency. The seal also acts as a locking mechanism between the pot and the lid. When the pressure builds up to an undesired level, the lid moves slightly upward and thereby releases the seal which releases the pressure in the pot. When the pressure subsides, the lid reengages the pot creating the seal and again maximizing cooking time.

Turning to the features of the High Speed, Spill-Proof Cooking Container of the invention, the present container design cooks a multiple of food varieties substantially faster than know commercially available pots. Moreover, the food cooked in the container of the invention retains its flavor and does not saturate or break down during the cooking process all the time keeping its original composition/consistency. Additionally, one can cook multiple food types (e.g., chicken and fish) at the same time in the container of the present invention without the food co-mingling flavors.

Referring generally to FIGS. 1-5, the present invention is a cooking container. Although the cooking container 10 shown in FIGS. 1-5 is illustrated as a cooking pot, this should not be considered restricting because it is contemplated that the present invention could take any form, including a cooking pan, cooking or baking dish, or any other cooking container. Moreover, although the optional embodiments shown in FIGS. 1-5 are illustrated as a cooking container 10 used on a stove top or in an oven, it is contemplated that the present invention could also include cooking containers used for other cooking methods such as microwaveable cooking containers.

With continued reference to FIGS. 1-5, a cooking container 10 according to the present invention could be formed of any material. As noted above, the cooking container 10 could be formed from metal, such as steel, iron, aluminum, or the like, ceramic, glass, plastic, or any other material. Similarly, the cooking container 10 could take any shape. Although the optional embodiment illustrated in FIGS. 1-5 has a generally cylindrical shape with a closed bottom 12, it is contemplated that the cooking container 10 could take any other shape. Optionally, the cooking container 10 could include one or more handles 34 to facilitate lifting.

More specifically, the cooking container 10 includes a container body 14 that defines the shape of the cooking container 10. According to the optional embodiments illustrated, the cooking container 10 includes an opening 16 defined by a rim 18. As noted above, the rim 18 defining the opening 16 could take any shape.

A cooking container 10 according to the present invention includes a ledge 20 spaced from the rim 18 into the container body 14. Optionally, the ledge 20 defines a second opening 22 smaller than the opening 16. In the optional embodiment illustrated, the ledge 20 projects into the container body 14 into the cooking container 10. The ledge 20 separates the cooking container 10 into an upper segment 24 and a lower segment 26. In an optional embodiment, the ledge 20 is continuous around the surface of the container body 10. In alternate optional embodiments, it is contemplated that the ledge 20 may be formed from separate segments that cooperate for form a ledge 20.

The cooking container 10 may further include a lid 28. The lid 28 may take any shape, but in an optional embodiment of the present invention, the lid 28 is shaped and sized so that it may pass through the rim 18 and rest on the ledge 20. That is, in such an optional embodiment, the lid 28 is shaped and/or sized to pass through the opening 16 and sized and/or shaped to close the second opening 22. It is noted that the lid 28 could include a handle 30, although a handle 30 is not necessary to the present invention.

Figure 1:
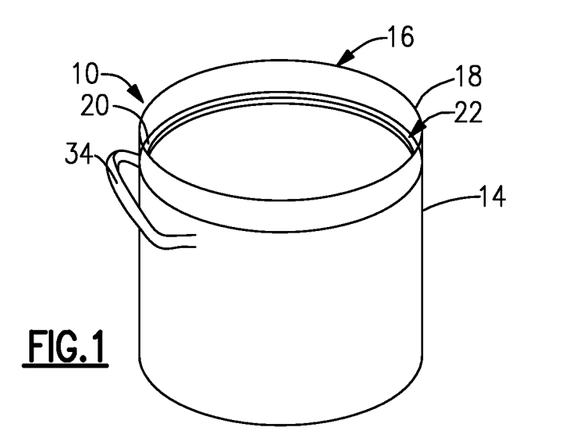
FIG. 1 is an elevated perspective view of a cooking container according to an embodiment of the present invention.
Figure 2:
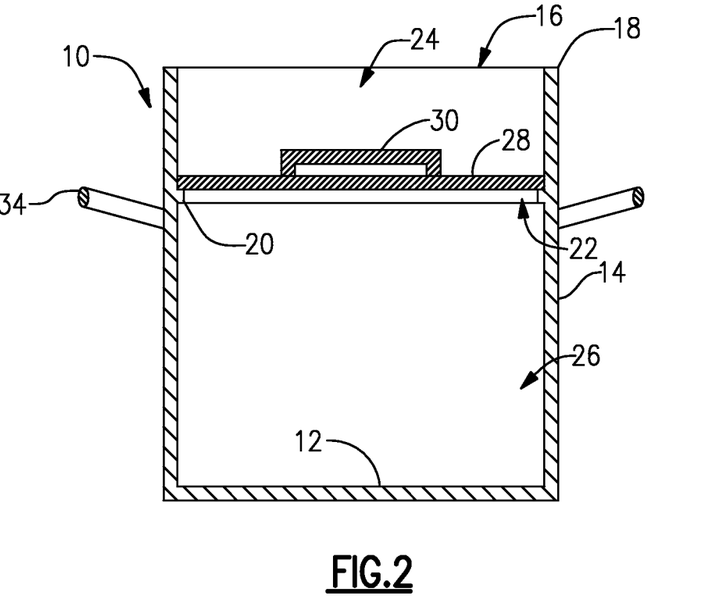
FIG. 2 is a cutaway side view of a cooking container according to the embodiment of FIG. 1.
Figure 3:
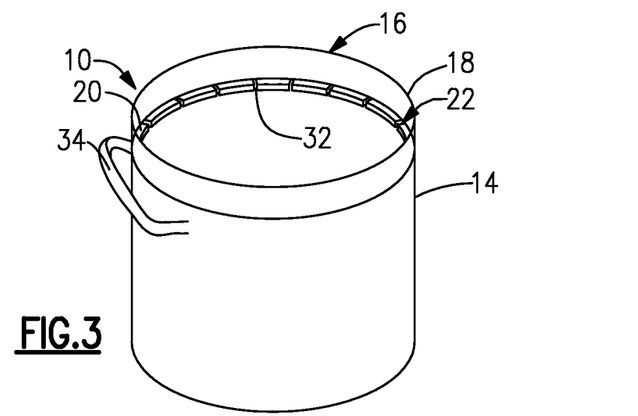
FIG. 3 is an elevated perspective view of a cooking container according to an embodiment of the present invention.
Figure 4:
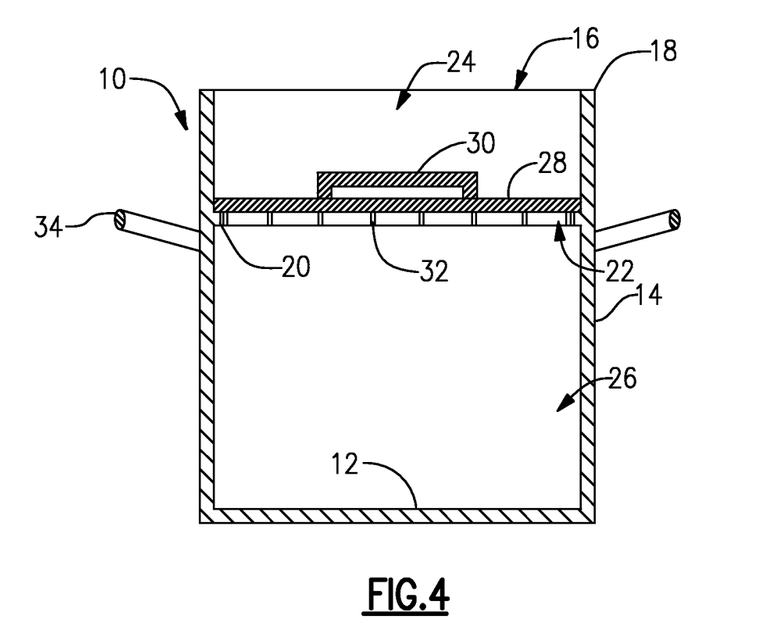
FIG. 4 is a cutaway side view of a cooking container according to the embodiment of FIG. 3.
Figure 5:
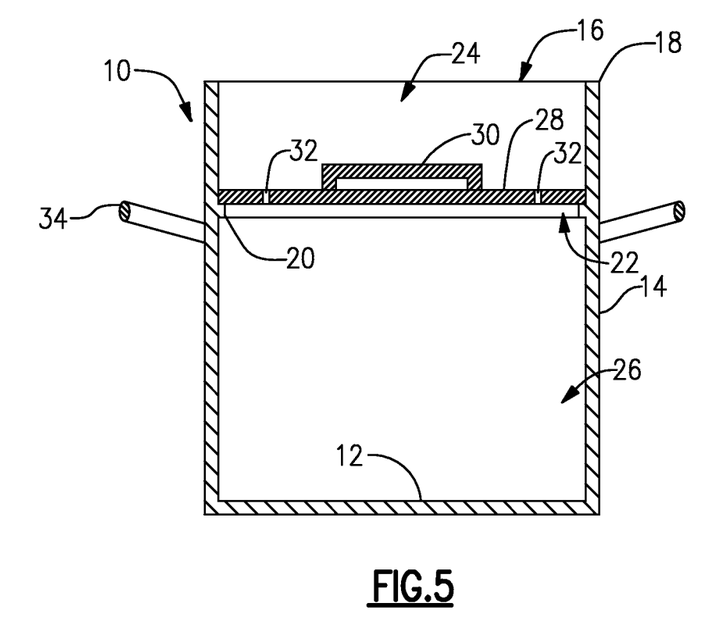
FIG. 5 is a cutaway side view of a cooking container according to an embodiment of the present invention.
Figure 6A:
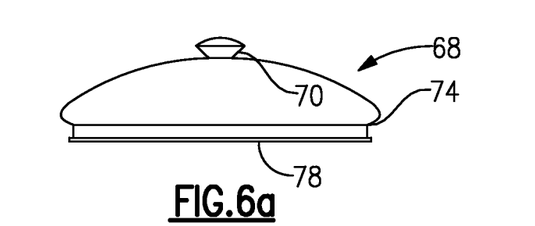
FIGS. 6(a)(b)&(c) are side, top and bottom views of an embodiment of the cooking container cover or lid of the present invention.
Figure 6B:
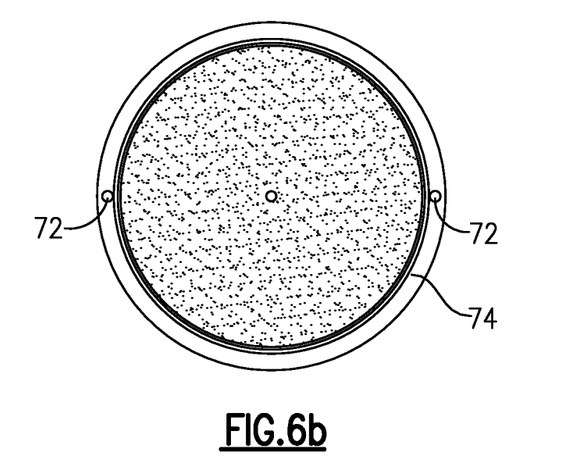
Figure 6C:
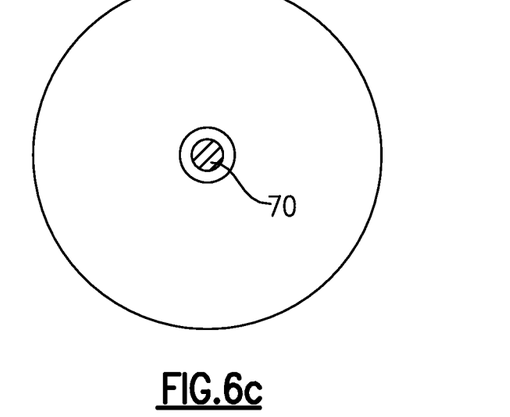

In an optional embodiment, such as that shown in FIGS. 3-5, one or more vents 32 may be provided. The vents 32 allow communication between the upper segment 24 and lower segment 26. Specifically, the vents 32 allow steam to escape from the lower segment 26 to the upper segment 26. In an optional embodiment, such as that shown in FIG. 5, the vents 32 may be in the lid 28. In another optional embodiment (not shown), the vents 32 may be in the container body 14. In yet another optional embodiment, such as that illustrated in FIGS. 3 and 4, the vents 32 maybe notches extending through the ledge 20. As suggested above, vents 32 in the ledge 20 could also be provided by segmenting the ledge 32. In any of these optional embodiments, the vents 32 could have any shape and/or size contemplated to allow the passage of steam from the lower segment 26 to the upper segment 24, but prevent the passage of large solids.

Referring again to FIGS. 1-5 generally, a cooking container 10 according to the present invention is used by placing the material to be cooked into the container body 14. As may be appreciated, in certain applications, the features of the present invention to avoid spillage may not be needed. In such applications, the cooking container 10 may be filled to, or beyond, the ledge 20. In an optional embodiment, a second lid (not pictured) may be provided that is sized to rest on the rim 18 rather than the ledge 20, to close the opening 16.

However, in applications where spillage from boil-over could occur, such as boiling, stewing, braising, or other wet cooking methods, the cooking container 10 would be filled to a point below the ledge 20, i.e. no higher than the second opening 22 defining the top of the lower segment 24. Thus, even with the lid 28 resting on the ledge 20, if the contents of the cooking container 10 boil over the level of the ledge 20, any potential spillage and expanding contents are captured in the upper segment 26 of the cooking container 10.

Referring to FIGS. 3-5 illustrating a further optional embodiment including vents 32, even with the lid 28 resting on the ledge 20, the vents 32 may reduce the probability of boil over by allowing steam to escape from the contents of the cooking container 10 in the lower segment 24 thereby reducing the rapid expansion of the contents in the first place. If the contents of the cooking container 10 do expand beyond the ledge 20, any potential spillage and the expanding contents are captured in the upper segment 26 of the cooking container 10.

With reference to FIGS. 6-9, there is shown a preferred embodiment of the container of the present invention.

More specifically, the cooking container 40 includes a container body 44 that defines the shape of the cooking container 40. According to the embodiment illustrated, the cooking container 40 includes an opening 46 defined by a rim 48. As noted above, the rim 48 defining the opening 46 could take any shape or size. It is understood in the art that cooking containers can take various shapes and sizes used in a home or restaurant kitchen depending on the particular food to be cooked. All shape and size containers incorporating the design of the present invention as claimed are deemed to be within the scope of the present invention.

A cooking container 40 according to the present invention includes a ledge 50 spaced from the rim 48 into the container body 44. The ledge 50 separates the cooking container 40 into an upper segment 54 and a lower segment 56. In an optional embodiment, the ledge 50 is continuous around the surface of the container body 44. In alternate optional embodiments, it is contemplated that the ledge 50 may be formed from separate segments that cooperate to form a ledge 50.

Figure 7:
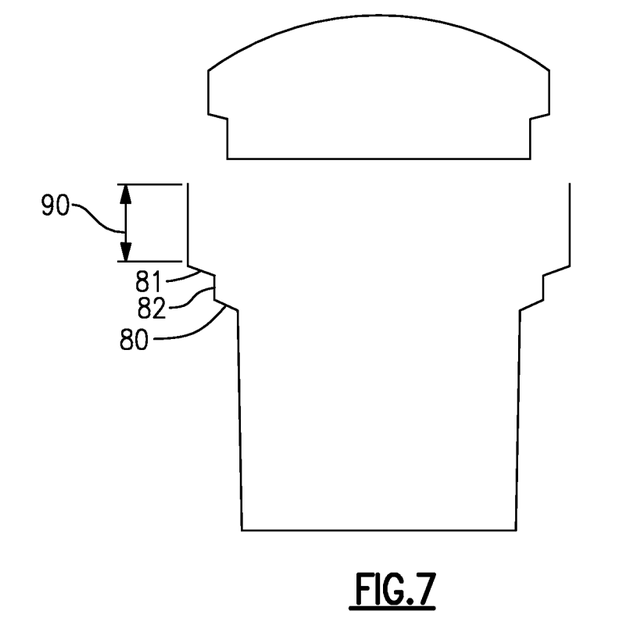
FIG. 7 is a fragmentary sectional view of cooking container and cover or lid of the present invention.

With reference to FIG. 7, the cooking container 40 further includes a lid 68. The lid 68 may take any shape, but in an optional embodiment of the present invention, the lid 68 is shaped and sized so that it may pass through the rim 48 and rest just above ledge 50. It is noted that the lid 68 could include a handle 70, although a handle 70 is not necessary to the present invention.

In an optional embodiment, such as that shown in FIG. 7(b), one or more vents 72 are incorporated into the lid provided. Specifically, vents 72 allow steam to escape from the lower segment 56 to the upper segment 54. In an optional embodiment, such as that shown in FIG. 7(b), the vents 72 are in the parameter of lid 68. In another optional embodiment (not shown), the vents 72 may be in the container body 44. Vents 72 in ledge 20 could also be provided by segmenting ledge 74. In any of these optional embodiments, the vents 72 could have any shape and/or size contemplated to allow the passage of steam from the lower segment 56 to the upper segment 54, but prevent the passage of large solids. Ledge 74 is an inwardly recessing shelf from lid 68 about ¼ inch to 1 inch in length and, preferably ½ inch in length and project at an angle from about 10 degrees to about 45 degrees and, most preferably at an angle of 25 degrees on which the vents 72 are located. Preferably, the lid 68 is concave in slope with a height extending from about 1 to about 4 inches above the lid edge 78 and most preferably 2 inches above the lid edge 78.

Figure 8:
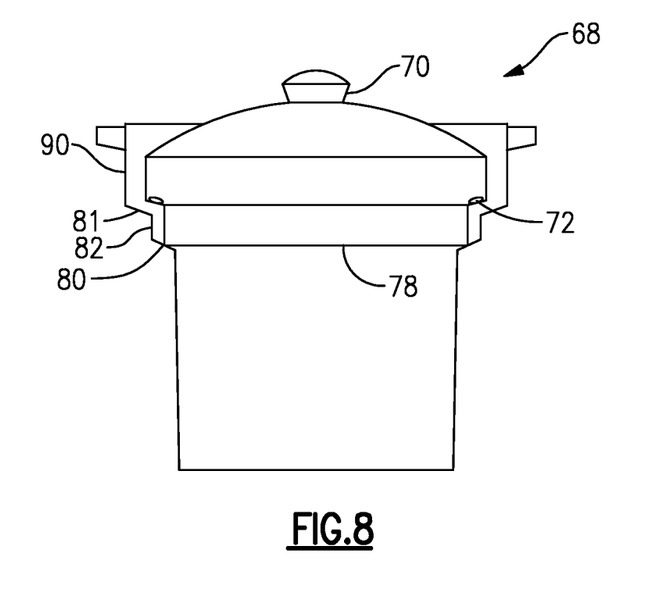
FIG. 8 is a perspective view of the cooking container and cover of the present invention.
Figure 9:
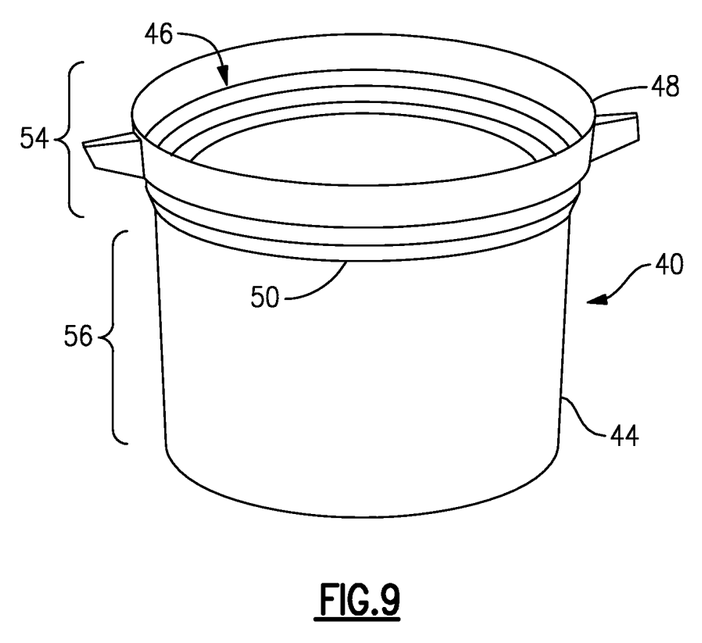
FIG. 9 is a side elevation view of the cooking container of the present invention.

With reference to upper segment 54 and, more particularly to FIG. 8, in a preferred embodiment of the invention the upper segment 54 is comprised of two ledges 80 and 81 positioned parallel to each other and integral to the cooking design of the present embodiment. Lower ledge 80, defines the reservoir slipway onto which cover ledge 78 rests and in the case of boil over of the contents of the container the path over which the contents from the lower segment (e.g., broth or water) travels back into container body 44. Connecting lower ledge 80 and upper edge 81 is a perpendicular edge 82 which defines the steam trap of the container of the invention. The area between the upper ledge 81 and the rim 48 of the cooking container defines the pot reservoir into which the steam escapes and collects from the container through vents 72. The contents of the container 44 along with the steam can escape through vents 72 and/or as lid 68 is pushed upward over the reservoir slipway and into the pot reservoir. It is understood that the steam and contents of the container 44 collect in the pot reservoir. The built-up steam exits into the atmosphere while the contents of the container travel back into container 44. That is, when the pressure in the container due to boiling subsides due to escape of the steam, the contents travel back into the lower segment of the container over the steam trap, the lid deploys back into the container onto the first ledge and the process begins all over again. In this way, the container of the invention uses the steam to maximize cooking efficiency while preventing spillage or boil-over.

With reference to FIG. 7, there is shown the most preferred design and dimensions of the cooking container of the present invention. These dimensions optimize the cooking efficiency and speed of the container of the invention; while at the same time reduce the likelihood of spillage during boil over. Preferably, ledges 80 and 81 are parallel to each other at an angle of between 10 and 45 degrees and between ½ and 4 inches in length. Most preferably, ledges 80 and 81 are parallel to each other at a 25 degree angle and 3¼ inches in length. The pot reservoir is preferably 1 to 3 inches in height measured form the rim 48 into the container and most preferably 1½ inches in height. It is understood that these dimensions can vary based on the size and shape of the pot provided the ratios between the dimensions remain unchanged to ensure the cooking results of the container of the present invention.

With reference to FIGS. 7-10, a cooking container 40 according to the present invention is used by placing the material to be cooked into the container body 46. As may be appreciated, in certain applications, the features of the present invention to avoid spillage may not be needed. However, in applications where spillage from boil-over could occur, such as boiling, stewing, braising, or other wet cooking methods, the cooking container 40 would be filled to a point below the ledge 50, defining the top of the lower segment 56. Thus, even with the lid 68 resting on the ledge 80 if the contents of the cooking container 40 boil over the level of the ledge 50 of the cooking container thereby pushing lid 68 slightly upward and off of ledge 80, any potential spillage and expanding contents are captured in the upper segment 54 of the cooking container 40 between the steam trap 82 and the pot reservoir 90 and thereafter falling back into container 44 via reservoir slipway 80, thereby reducing the rapid expansion of the contents in the first place which is what causes the spill over.

The invention is explained in more detail below on the basis of the following Examples.

Example 1

Yams (Sweet Potatoes)

| | |
|---|---|
| 1 cup (250 ml) orange juice | ½ cup (125 ml) brown sugar |
| 2 large sweet potatoes | 1 teaspoon (5 ml) grated orange zest |
| Salt, to taste | 2 tablespoons (30 ml) butter |

Directions:

Pour the orange juice into the cooking container. Peel the sweet potatoes and cut them in half lengthwise. Arrange in the cooking container and sprinkle with salt, brown sugar and orange zest. Dot with butter. Put the lid in place, heat on high and cook for 25 minutes. Remove the lid and lift out the sweet potatoes. In contrast, a conventional cooking pot (All Clad) takes 55 minutes to 1 hour 10 minutes to cook the yams. By way of additional example, boiling whole, large potatoes cut into slices takes about 13 minutes in the pot of the invention, as compared to a conventional cooking pot (All Clad, Paderno and Mauviel) which takes 45 minutes to 1 hour to boil the potatoes.

Example 2

Beans

Old-fashioned baked beans were a traditional weekend dish on the east coast of Canada and the US. Sometimes called Boston baked beans with the addition of pork. In recent years due to people's active lifestyles, it has fallen out of favor because of the traditionally long baking time (about 7 hours). Even pressure cookers require the beans to be soaked for about 8 hours prior to cooking. The cooking container of the present invention now make it easy and fast, cutting the cooking time down to about 1 hour without soaking.

| | |
|---|---|
| 2 cups (500 ml) dry navy beans (also called white beans or pea beans) | 2 fl oz (80 ml or ½ small can) tomato paste |
| 3 tablespoons (45 ml) canola oil | 3 tablespoons (45 ml) brown sugar |
| 1 large onion, diced | 2 tablespoons (30 ml) molasses |
| 1 clove garlic, minced | ½ teaspoon (2.5 ml) prepared mustard |
| 1¾ cups (400 ml) water | ¼ teaspoon (1 ml) cumin |
| | ⅛ teaspoon (0.5 ml) chili powder |

Directions:

Rinse and the beans in water. Add all ingredients except the beans to the cooking container. Stir. Then add the beans. Bring the beans to a boil. Stir and then put the lid on the cooking container and cook for one hour. In contrast, a conventional cooking pot (All Clad, Paderno and Mauviel) takes about 5½ to 6 hours to cook the beans. A standard pressure cooking pot, takes just less than one hour but requires the beans to be soaked for about 7 to 8 hours in advance of cooking which also dissolves valuable minerals that are essential for food consumption and taste value. These pots also require time for the steam to build up and decompress adding lengthy minutes to the cooking process, notwithstanding the safety risk dealing with the high pressure steam. By way of another example, the same holds true for cooking red kidney beans in the pot of the present invention. That is, the beans are fully cooked to taste in one hour without pre-soaking.

Example 3

Pot Roast with Vegetables

| | |
|---|---|
| 3¼ lb (1.5 kg) chuck or round roast, trimmed of excess fat | 2 bay leaves |
| 4 tablespoons (60 ml) vegetable oil | 1 teaspoon (5 ml) dried thyme |
| Salt and pepper | — |
| 1 cup (250 ml) onion, finely chopped | 1 lb (450 g) medium-size red potatoes, scrubbed and quartered |
| ½ cup (125 ml) carrot, finely chopped | |
| ½ cup (125 ml) celery, finely chopped | 3 large-size carrots, peeled and cut into 5 or 6 chunks |
| ½ cup (125 ml) parsnip or turnip, finely chopped | |
| 2½ cups (625 ml) beef stock | 3 large-size parsnips, peeled and cut into 5 or 6 chunks |

Directions:
Roast: Heat 3 tablespoons oil in cooking container and heat over high heat. Add meat and brown well on all sides lifting meat frequently with long wooden spoon to prevent sticking—about 2 to 3 minutes per side. Add extra oil as needed. Season each side with salt and pepper (use less if using canned stock or bouillon). Remove meat to platter and set aside. In blackened oil remaining in cooking container, sauté the chopped onion, carrot, celery, and parsnip for 3 minutes, stirring occasionally. Scrape any browned bits from bottom of cooker. Add beef stock, bay leaves, and dried thyme. Place meat in cooking container broad side down, so that as much surface as possible submerges. Cook beef and vegetables for 45 minutes. In contrast, a conventional cooking pot (All Clad, Paderno and Mauviel) at low for 7 to 9 hours or on high 3½ to 4½ hours to cook the pot roast. By way of additional example butter steak, cooking a ½ lb. beef in 3¼ pound of butter takes about ten (10) minutes.

Example 4

Crumb-Topped Vegetables

| | |
|---|---|
| 3 tablespoons (45 ml) butter or use veg oil | 1 pound (450 g) carrots, peeled and cut into 2" (50 mm) sticks* |
| ¼ cup (60 ml) dry bread crumbs | |
| 1 teaspoon (5 ml) lemon juice | |
| 1 tablespoon (15 ml) minced parsley | *Alternatively use 1 lb (450 g) broccoli and/or cauliflower flowerets or green beans |

Directions:
Melt the butter (or heat oil) in the cooking container, add the bread crumbs and cook until they are golden and crunchy. Stir in the lemon juice and parsley and transfer to a small bowl. Reserve. Wipe out the cooking container. Pour 1¾ cups (400 ml) water into the pressure cooker. Put the carrots or other vegetables in the cooking container and sprinkle with salt. Put the lid in place and bring to boil and cook for seven (7) minutes. Remove the lid, drain well spoon the crumb mixture over the carrots and serve. In contrast, a conventional cooking pot (All Clad, Paderno and Mauviel) takes about 25 minutes with continuous stir and monitoring to achieve even cook of the vegetables.

Example 5

Chicken Cacciatore (Bone-in)

Chicken cacciatore ordinarily takes about 60 minutes of simmering to get the rich flavors, but cooked in the cooking container of the present invention only takes 45 minutes.

| | |
|---|---|
| 3 to 3½ lb (1.4 to 1.6 kg) chicken pieces, skinless | 10 mushrooms, sliced |
| ⅓ cup (80 ml) flour | 2 bay leaves |
| ¼ to ⅓ cup (60 to 80 ml) olive oil | 2 teaspoons (10 ml) grated orange zest |
| 2 cloves garlic, minced | Pinch crushed red pepper flakes |
| 1 large onion, chopped | 1 teaspoon (5 ml) dried oregano |
| 2 stalks celery, sliced | 1 teaspoon (5 ml) fennel seeds |
| ⅔ cup (160 ml) white wine | ½ teaspoon (2 ml) thyme |
| 1 large can (28 fl oz or 796 ml) diced tomatoes, untrained | ½ teaspoon (2 ml) salt |
| | Black pepper, to taste |
| 1 small can (5.5 oz or 156 ml) tomato paste | ½ cup (125 ml) fresh parsley, minced or 1 teaspoon (5 ml) dried parsley |

Directions:
Rinse the chicken pieces, pat dry, and coat with flour. In the cooking container of the invention, heat olive oil on medium heat and brown chicken pieces on both sides in batches, adding oil if needed. Set chicken aside. In the oil that remaining in the cooking container, sauté the onion and garlic until onion is soft. Add the green pepper and celery, then the wine, stirring. Stir in the rest of the ingredients, except only half of the parsley. Add the chicken and stir to coat the chicken with the sauce. Put the lid in place and cook on high heat for 35 to 40 minutes. In contrast, a conventional cooking pot (All Clad, Paderno and Mauviel) takes 1½ to 2 hours to cook the chicken dish.

Example 6

Cooking Multiple Foods without Comingling Food and Flavor

Skillet Steamed Fish: Halibut and Salmon Cooked Together
1 tablespoon Vegetable oil
1 Onion, coarsely chopped
1 Garlic clove, crushed
2 Large tomatoes, blanched
Peeled, seeded and chopped
2 tablespoons Wine or cider vinegar
¾ cup Water
4 Large fish fillets
Freshly ground black pepper Heat oil in pot over medium heat. Add onion and garlic and cook, stirring frequently until onion is golden brown, about five minutes. Add tomatoes. Stir well and cook until tomatoes are just heated through, about 2 minutes. Add vinegar and stir well.

Push tomato mixture to one side of pot. Add water. When liquid starts to simmer, add fish and cover the Pot. Cook till fish flakes easily, 8-10 minutes. In contrast, a conventional cooking pot (All Clad, Paderno and Mauviel) 20 to 25 minutes with both fish type tasting alike caused by saturation and lengthen time.

Remove fish and arrange on serving platter. Add pepper to taste to the tomato mixture and stir. Spoon the tomato mixture over the fish and serve immediately. Both fish type maintains there individual flavor without co-mingling when cooked in the cooking container of the invention even though high in flavor.

While certain embodiments of the present invention have been shown and described it is to be understood that the present invention is subject to many modifications and changes without departing from the spirit and scope of the invention presented herein.

What is claimed is:

1. A cooking container comprising:
   a container body having an opening defined by a rim;
   a ledge disposed inside said container body and spaced a predetermined distance from said rim, said ledge dividing said container body into an upper segment and a lower segment;
   a lid sized to pass through said opening and rest on said ledge such that when said lid rests on said ledge, said lid is spaced a predetermined distance below said rim to separate said lower segment of said container body from said upper segment of said container body; and
   a vent formed by one or more notches extending through said ledge to create a passage between said lower segment of said container body and said upper segment of said container body.

2. The cooking container of claim 1 wherein said ledge projects from said container body to define a second opening smaller than the opening at said rim.

3. The cooking container of claim 1 wherein said lid comprises at least one perforations formed therethrough to create a passage between said lower segment of said container body and said upper segment of said container body.

4. A cooking container comprising:
   a container body having an opening defined by a rim;
   a first ledge disposed inside said container body and spaced from said rim, said ledge dividing said container body into an upper segment and a lower segment for holding the contents to be cooked;
   said upper segment containing a second ledge disposed inside said container body between said first ledge and said rim;
   a lid sized to pass through said opening and rest on said first ledge such that when said lid rests on said first ledge, said lid is spaced from said opening defined by said rim to separate said lower segment of said container body from said upper segment of said container body
   said lid containing at least one vent forming a passage in the cooking container between said lower segment of said container body and said upper segment of said container body for steam and cooking contents to pass through;
   a steam trap defined by the space between the first ledge and the second ledge for trapping steam escaping from said lower segment through said at least one vent and collecting said steam to flow back into the lower segment of said container;
   a pot reservoir defined by the space between the second ledge and the rim for trapping steam and contents from the lower segment thereby preventing spillage.

5. The cooking container of claim 4, wherein said second ledge is parallel to said first ledge.

6. The cooking container of claim 5, wherein said first ledge and said second ledge are parallel to each other at with each extending at an angle of between 10 degrees and 45 degrees.

7. The cooking container of claim 4, wherein said lid contains between one and four vents.

8. The cooking container of claim 7, wherein said lid contains two vents.

9. The cooking container of claim 4, wherein said vents are located on the parameter of said lid.

10. The cooking container of claim 4, wherein said vent is between about 0.78 of an inch ¾ of an inch in diameter.

11. The cooking container of claim 4, wherein the lid is concave in slope with a height extending 1 to 4 inches above said rim.

12. The cooking container of claim 4, wherein said first ledge and said second ledge are between ½ inch and 4 inches in length.

13. The cooking container of claim 9, wherein said pot reservoir is preferably 1 to 3 inches in height measured from said rim into said container body.

14. The cooking container of claim 4, wherein said steam trap is preferably 0.5 to 2 inches in height measured between said first and second ledges.

* * * * *